(12) United States Patent
Feng et al.

(10) Patent No.: US 11,109,149 B2
(45) Date of Patent: Aug. 31, 2021

(54) SOUND ABSORBING MATERIAL AND SPEAKER BOX USING SAME

(71) Applicant: AAC Acoustic Technologies (Shenzhen) Co., Ltd., Shenzhen (CN)

(72) Inventors: Hongshu Feng, Shenzhen (CN); Hezhi Wang, Shenzhen (CN); Kun Tang, Shenzhen (CN); Guochuang Huang, Shenzhen (CN)

(73) Assignee: AAC ACOUSTIC TECHNOLOGIES (SHENZHEN) CO., LTD., Shenzhen (CN)

( * ) Notice: Subject to any disclaimer, the term of this patent is extended or adjusted under 35 U.S.C. 154(b) by 0 days.

(21) Appl. No.: 16/522,688

(22) Filed: Jul. 26, 2019

(65) Prior Publication Data

US 2020/0037063 A1  Jan. 30, 2020

(30) Foreign Application Priority Data

Jul. 28, 2018 (CN) .......................... 201810849795.1

(51) Int. Cl.

| | | |
|---|---|---|
| *B01J 20/18* | (2006.01) | |
| *H04R 1/28* | (2006.01) | |
| *C01B 37/00* | (2006.01) | |
| *G10K 11/162* | (2006.01) | |
| *H04R 1/02* | (2006.01) | |
| *F01N 1/10* | (2006.01) | |
| *C01B 39/12* | (2006.01) | |
| *C01B 39/06* | (2006.01) | |
| *C01B 39/36* | (2006.01) | |
| *C01B 39/38* | (2006.01) | |
| *B01J 29/06* | (2006.01) | |
| *B01J 29/04* | (2006.01) | |
| *B01J 29/068* | (2006.01) | |

(Continued)

(52) U.S. Cl.
CPC .............. *H04R 1/288* (2013.01); *B01J 20/18* (2013.01); *B01J 20/186* (2013.01); *C01B 37/005* (2013.01); *F01N 1/10* (2013.01); *G10K 11/162* (2013.01); *H04R 1/025* (2013.01); *B01J 29/046* (2013.01); *B01J 29/047* (2013.01); *B01J 29/061* (2013.01); *B01J 29/064* (2013.01); *B01J 29/068* (2013.01); *B01J 29/072* (2013.01); *B01J 29/076* (2013.01); *B01J 29/40* (2013.01); *B01J 29/405* (2013.01); *B01J 29/44* (2013.01); *B01J 29/46* (2013.01); *B01J 29/48* (2013.01); *B01J 29/86* (2013.01); *B01J 29/87* (2013.01); *B01J 29/88* (2013.01); *B01J 29/89* (2013.01); *B01J 35/0006* (2013.01); *B01J 35/023* (2013.01); *B01J 37/0072* (2013.01); *B01J 37/0201* (2013.01); *B01J 37/031* (2013.01); *B01J 37/30* (2013.01); *B01J 2229/183* (2013.01); *B01J 2229/186* (2013.01); *B01J 2229/42* (2013.01); *C01B 37/007* (2013.01); *C01B 39/06* (2013.01); *C01B 39/065* (2013.01); *C01B 39/12* (2013.01); *C01B 39/36* (2013.01); *C01B 39/38* (2013.01); *C01B 39/42* (2013.01); *H04R 2201/029* (2013.01)

(58) Field of Classification Search
CPC .. H04R 1/288; H04R 1/025; H04R 2201/029; G10K 11/162; F01N 1/10; C01B 37/007; C01B 37/005; C01B 39/06; C01B 39/065; C01B 39/12; C01B 39/36; C01B 39/38; C01B 39/42; B01J 29/046; B01J 29/047; B01J 29/061; B01J 29/064; B01J 29/068; B01J 29/072; B01J 29/076; B01J 29/86; B01J 29/87; B01J 29/88; B01J 29/89; B01J 29/40; B01J 29/405; B01J 29/44; B01J 29/46; B01J 29/48; B01J 37/031; B01J 37/0072; B01J 37/0201; B01J 37/30; B01J 35/0006; B01J 35/023; B01J 2229/42; B01J 2229/183; B01J 2229/186; B01J 20/18; B01J 20/186
USPC ......... 502/60, 61, 62, 74, 77, 400, 406, 407, 502/411; 423/713
See application file for complete search history.

(56) References Cited

U.S. PATENT DOCUMENTS

| | | | | |
|---|---|---|---|---|
| 3,702,886 | A | * | 11/1972 | Argauer et al. .......... C01B 39/40 423/705 |
| 3,709,979 | A | * | 1/1973 | Chu ........................ C10G 11/04 423/700 |
| 3,790,471 | A | * | 2/1974 | Argauer et al. ........ C07C 15/067 208/111.15 |

(Continued)

FOREIGN PATENT DOCUMENTS

WO    WO 2014/036289    *    3/2014

OTHER PUBLICATIONS

Janda, Effects of Zeolite Structure and Si/Al Ratio on Adsorption Thermodynamics and Intrinsic Kinetics of Monomolecular Cracking and Dehydrogenation of Alkanes over Bronsted Acid Sites, 2015.*

(Continued)

*Primary Examiner* — Elizabeth D Wood
(74) *Attorney, Agent, or Firm* — W&G Law Group LLP

(57) ABSTRACT

The present disclosure provides a sound absorbing material. The sound absorbing material comprises MFI-structural-type zeolite. The MFI-structural-type zeolite comprises a framework, and the framework comprises $SiO_2$ and $AlO_3$, and the mass ratio of Si to Al in the framework is less than 200 and not less than 50. The present disclosure also provides a speaker box applying the sound absorbing material. The sound absorbing material provided by the present disclosure and the speaker box using the sound absorbing material can further improve the performance of the speaker box, reduce the failure of zeolite and improve the performance stability of the speaker box.

11 Claims, 4 Drawing Sheets

(51) Int. Cl.
*B01J 29/064* (2006.01)
*C01B 39/42* (2006.01)
*B01J 29/86* (2006.01)
*B01J 29/89* (2006.01)
*B01J 29/40* (2006.01)
*B01J 29/072* (2006.01)
*B01J 29/076* (2006.01)
*B01J 29/87* (2006.01)
*B01J 29/88* (2006.01)
*B01J 29/46* (2006.01)
*B01J 29/48* (2006.01)
*B01J 29/44* (2006.01)
*B01J 37/02* (2006.01)
*B01J 37/00* (2006.01)
*B01J 37/03* (2006.01)
*B01J 37/30* (2006.01)
*B01J 35/02* (2006.01)
*B01J 35/00* (2006.01)

(56) References Cited

U.S. PATENT DOCUMENTS

| 4,229,424 | A | * | 10/1980 | Kokotailo | C01B 37/02 502/64 |
| 4,289,607 | A | * | 9/1981 | Kokotailo | B01J 29/40 208/120.05 |
| 4,703,025 | A | * | 10/1987 | Kokotailo | B01J 29/40 423/700 |
| 2013/0170687 | A1 | * | 7/2013 | Papakyriacou | B01J 20/183 381/338 |
| 2014/0064540 | A1 | * | 3/2014 | Lin | H04R 1/2803 381/346 |
| 2014/0186244 | A1 | * | 7/2014 | Blakeman | B01J 29/7615 423/213.5 |
| 2014/0311820 | A1 | * | 10/2014 | Lin | B01D 53/0407 181/199 |
| 2015/0068402 | A1 | * | 3/2015 | Lin | C08J 9/40 96/153 |
| 2015/0104364 | A1 | * | 4/2015 | Elomari | B01D 53/9418 423/212 |
| 2016/0127812 | A2 | * | 5/2016 | Papakyriacou | B01J 20/2808 381/338 |
| 2016/0318299 | A1 | * | 11/2016 | Arai | C09D 11/10 |

OTHER PUBLICATIONS

ACS Material Data Sheet, https://www.acsmaterial.com/zsm-5-series-zeolite-powder.html, no date available, downloaded 2021.*

* cited by examiner

SOUND ABSORBING MATERIAL AND SPEAKER BOX USING SAME

FIELD OF THE DISCLOSURE

The present invention relates to a sound absorbing material field, and more particularly to a speaker box using the sound absorbing material.

DESCRIPTION OF RELATED ART

With the development of science and technology and improvement of living standards, electronic devices are rapidly developing in the direction of diversification, such as energy-saving, lightweight, intelligent, information, multi-system, multi-functional and entertainment. People put forward higher requirement on the performance, volume and so on of electronic devices, which makes the speaker box of electronic devices more and more demanding, especially for speaker box of mobile phones, it not only requires the speaker box to have a smaller volume, but also can provide excellent acoustic performance. Since the volume of electronic devices becomes more and more compact, the volume of the cavity for receiving the speaker system is being smaller and smaller. A decrease in the volume of the posterior cavity in the speaker box significantly reduces its low-band response, resulting in poor acoustic performance.

In a related art, the posterior cavity of the speaker box is usually filled with multi-porous carbon, silica silicon dioxide, highly hydrophobic high silica zeolite and other sound absorbing materials to increase the virtual volume of the posterior cavity, improve the sound compliance of the posterior cavity gas, and thereby improving the low-frequency performance, of which the high silica zeolite with high hydrophobic has the best effect on improving the low-frequency performance.

However, ordinary zeolite easily adsorbs moisture in the air at normal temperature and occupies micro-pores. In order to maintain the patency of micro-pores at normal temperature, high silica zeolite with high hydrophobicity is usually selected. Usually the mass ratio of Si to Al is higher than 200, although an excellent acoustic performance of low-frequency can be obtained, due to the small amount of charged ions in the micro-pores and frameworks, so the interaction between zeolite and air molecules ($N_2$, $O_2$) is mainly van der Waals force, and the electrostatic field interaction with air molecules is very limited, and the amount of air adsorbed at normal temperature is limited., resulting in limited the further improvement of the low-frequency improvement performance.

Therefore, it is desired to provide new and improvement sound absorbing materials and a speaker box using the same to overcome the aforesaid problems.

BRIEF DESCRIPTION OF THE DRAWINGS

Many aspects of the exemplary embodiments can be better understood with reference to the following drawings. The components in the drawing are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
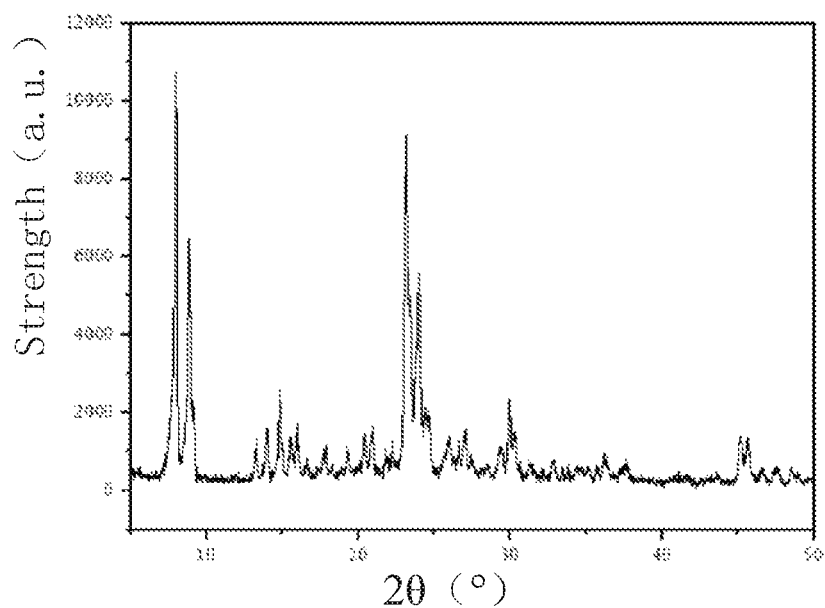
FIG. 1 is an XRD pattern of a structural zeolite corresponding to the sound absorbing material disclosed in the embodiment 1 of the present disclosure.

The present disclosure will be hereinafter described in detail below with reference to the attached drawings and embodiments thereof.

The present disclosure relates to a sound absorbing material, wherein the sound material comprises MFI-structural-type zeolites. The MFI-structural-type zeolite comprises frameworks, and the frameworks comprise $SiO_2$ and $Al_2O_3$, and a mass ratio of Si to Al in the framework of the MFI-structural-type zeolite is less than 200 and not less than 50.

In addition, the MFI-structural-type zeolite further comprises extra-framework cations, the extra-framework cations are at least one of hydrogen ions, a monovalent copper ion, monovalent silver ions, monovalent gold ions, alkali metal ions or alkaline earth metal ions.

Compared with the relevant art, for the sound absorbing material of the present disclosure, since the MFI-structural-type zeolite is composed of silicon dioxide having uniformly distributed micro-porous structure, and the micro-pores under the acoustic pressure is used for absorbing and desorbing the attached air molecules. The micro-porous structure of the silicon dioxide can play a role in increasing the volume of the virtual acoustic cavity, while filling the silicon dioxide having a plurality of uniform micro-pores in the posterior cavity of the speaker box. It can significantly improve the low-frequency effect of the speaker box and improve the low-frequency acoustic performance.

In addition, due to the MFI-structural-type zeolite's small volume, the MFI-structural-type zeolite can be placed in a small cavity, which can solve the problem that the sound cavity of the speaker is difficult to package the sound absorbing material, so as to meet the requirement that the speaker develops toward a smaller and smaller volume.

In addition, the MFI-structural-type zeolite further comprises extra-framework cations, which can effectively improve the stability of the zeolite, thereby improving the performance stability of the speaker. It should be noted that when the molar ratio of silicon to aluminum is too low, the micro-porous structure which play a role of adsorbing and desorbing in the MFI-structural-type zeolite can significantly adsorb the moisture in the air, and the moisture occupies the micro-pores of most MFI-structural-type zeolites, resulting in low frequency improvement effect decrease. The molar ratio of silicon to aluminum is too high, the Al content in the MFI-structural-type zeolite is too low, the amount of cations introduced is too small, and the organic matter in the air and the speaker box is easy to enter micro-porous pores of the MFI-structural-type zeolite to make the low frequency improvement effect invalid. Therefore, in the present embodiment, the silicon-aluminum mass ratio is between less than 200 and not less than 50, so that the low-frequency improvement effect of the sound absorbing material is better, and the low-frequency improved performance stability is better.

Specifically, in the present disclosure, the Si to Al mass ratio is preferably 80 or more, and less than 200, preferably, the Si to Al mass ratio in the framework is between 120 and 200, more preferably, between 140 and 200.

The method for processing the sound absorbing material of the present disclosure comprises the following steps:

Step S1: adding a synthetic raw material (a silicon source, an aluminum source, a template agent, an alkali source, etc.) to the synthesis reaction vessel, and then synthesizing the zeolite grain by crystallization reaction, wherein the crystallization reaction is generally performed in an aqueous phase. The reaction time is also called hydrothermal reaction. The hydrothermal reaction temperature is generally from normal temperature to 250° C., preferably from normal temperature to 180° C. The hydrothermal reaction pressure is generally the pressure generated by the solvent water itself as a function of temperature; the hydrothermal reaction cycles are usually half an hour to several months depending on the situation, preferably are 4 h to 240 h. It should be noted that the zeolite grains described in the method are MFI-structural-type zeolites.

Step S2: moldable synthetic zeolite particles are obtained by solid-liquid separation and cleaning with centrifuges and/or filter presses. After high-temperature roasting, cations exchange, particle shaping, and sieving, the desired zeolite particles are obtained. Zeolite particles are also called shaped particles.

Before using MFI-structural-type zeolite, different types of MFI-structural-type zeolite are obtained by exchanging with cations according to the situation. The zeolite is exchanged with one of the ammonium salt, monovalent copper salt, monovalent silver salt, monovalent gold salt, alkali metal salt or alkaline earth metal salt. The ammonium salt mainly comprises ammonium chloride, ammonium nitrate, ammonium sulfate, ammonium carbonate, etc. The copper salt comprises cuprous chloride, the silver salt comprises silver nitrate. The alkali metal mainly comprises lithium salt, sodium salt, potassium salt, barium salt and the like. The anion of the alkali metal salt comprises chloride ion, sulfate ion, nitrate ion, etc.; the alkaline earth metal mainly comprises magnesium salt, calcium salt, barium salt, etc.; the anion of the alkaline earth metal salt comprises chloride ion, sulfate ion, nitrate ion and the like.

More importantly, the sound absorbing material is mainly composed of the zeolite raw powder. Usually, the zeolite raw powder is not a complete single crystal, but a polycrystal formed by stacking a plurality of small zeolite grains. The zeolite grain size of the MFI-structural-type zeolite is the size of the zeolite raw powder for synthesizing the sound absorbing material. In this embodiment, the MFI-structural-type zeolite has a grain size of 10 nm to 10 μm, preferably between 20 nm and 8 μm, more preferably of 40 nm to 6 μm.

Since the size of the zeolite raw powder is too small, it should not be directly used as a sound absorbing material filled in the speaker box to avoid the speaker entering the speaker box and affecting its acoustic performance. Usually, it needs to be formed into a specific particle size and shape by a specific molding method; in addition to the zeolite raw powder, a certain amount of binder, such as a solvent, a binder, an additive, etc., must be added in the molding process to form a final shape for shaped particles.

Wherein, the specific molding methods include, but are not limited to, the ball granulation method, the spray granulation method, the post-squeezing method, the post-spinning method, the ultrasonic atomization granulation, and the like.

Wherein the "specific particle size" means that the particle size of the shaped particle upon the molding (that is, the sound absorbing material is molded into the final shaped particles) is between 10 μm to 1000 μm. Preferably, the shaped particles have a particle size of from 20 μm to 600 μm, more preferably from 30 μm to 450 μm. Acoustic results continue to increase as the particle size becomes smaller, and 200-300 μm results will be better. The shaped particles formed after the sound absorbing material is molded, that is, after the zeolite raw powder is molded, the shaped particles are used as a multi-particle sound absorbing material (shaped particles) when used in a speaker box.

In order to maximize the low-frequency improvement effect of the zeolite raw powder, the size range of the shaped particles is determined according to the raw powder particle size, post-forming bulk density, and molding method:

Wherein the molding shape comprises spherical particles, irregular polyhedral particles, clover shape and so on, but is not limited thereto.

Wherein the solvent comprises ethanol, toluene, acetone, tetrahydrofuran, and so on, but is not limited thereto.

Wherein the binder comprises at least one of an inorganic binder or an organic polymer binder. The inorganic binder comprises activated alumina, silica sol, and the like;

Wherein the organic binder comprises acrylates, epoxy resins, polyurethanes, and the like.

In addition, the framework further comprises a trivalent and/or tetravalent metal ion oxide more than $Al_2O_3$. More preferably, the framework further comprises at least one of boron (B), iron (Fe), gallium (Ga), chromium (Cr), titanium (Ti), zirconium (Zr), and germanium (Ge), Oxide. It will be understood by those skilled person in the art that the types of trivalent ions and tetravalent ions are not limited to the above examples, and may be other ions, and do not affect the effects of the present disclosure.

It is worth mentioning that, in the present embodiment, the MFI-structural-type zeolite mainly comprises silicon dioxide and aluminium trioxide. If the mass ratio of Si to Al is less than 50, it will significantly adsorb Moisture in the Air, and occupy micro-porous channels of most MFI-structural-type zeolite, resulting in poor low-frequency improvement effect; although the mass ratio of Si to Al is higher than 200, although a good low-frequency improvement effect can be achieved, however due to the small amount of zeolite micro-porous channels and framework ions in the MFI-structure-type zeolite, the interaction between zeolite and air molecules ($N_2$, $O_2$) is dominated by van der Waals forces, and the electrostatic field interaction with air molecules is very limited, and the amount of adsorbed air at normal temperature is limited.

The preset disclosure notifies the contradiction between the water absorption and the electrostatic field effect, selects the appropriate synthesis and post-treatment method, and obtains the MFI-structural-type zeolite which is not easy to absorb water and has a significant increase in the amount of air absorbed and desorbed at room temperature, and the zeolite has better performance in low frequency improvement. Excellent, harsh environment and long-term stability, the zeolite Si to Al mass ratio is less than 200 and not less than 50, preferably less than 200 and not less than 80, still more preferably less than 200 and not less than 120.

It should be noted that the sound absorbing material may be comprised of MFI-structural-type zeolite completely. Because of the high purity of the MFI-structural-type zeolite completely, the speaker box filled with the MFI-structural-type zeolite in the rear cavity has better acoustic performance in the low-frequency band. Of course, the sound absorbing material may also containing a small amount of other hetero phases, such as MEL, BEA, etc., without affecting the effects of the present disclosure. Due to different synthesis methods, some of the obtained MFI-structural-type zeolites are mixed with a small amount of zeolites such as MEL and BEA. These zeolite structures have certain low-frequency effects, but the micro-porous structure is slightly different, and the low-frequency improvement performance is also different.

The extra-framework cations mainly comprise one or more of a hydrogen ion, a monovalent copper ion, a monovalent silver ion, a monovalent gold ion, an alkali metal, and an alkaline earth metal.

For example, the alkali metal group ions include $Li+$, $Na+$, $K+$, $Rb+$, and the alkaline earth metal group of $Be2+$, $Mg2+$, $Ca2+$, $Sr2+$, and $Ba2+$, but are not limited thereto.

The extra-framework cations acquisition mode is introduced during the synthesis of the MFI-structural-type zeolite, or during the exchange process of the MFI-structural-type zeolite post-treatment, or during the MFI-structural-type zeolite roasting process.

Embodiments of the present disclosure are explained below in conjunction with specific examples.

Embodiment 1

In the first preferred embodiment of the sound absorbing material of the present disclosure, synthesis of the MFI-structural-type zeolite and acoustic properties:

The MFI-structural-type zeolite having a Si to Al ratio of 80 is synthesized by using a silicon source (including tetraethyl orthosilicate, silica sol, sodium silicate, etc.), an aluminum source (including aluminum nitrate, aluminum chloride, sodium metaaluminate, aluminum isopropoxide, etc.), an alkali source (including sodium hydroxide, hydrogen), a template agent and water synthesis. Wherein the template agent is one of tetrapropyl quaternary ammonium salt (at least one of a tetrapropylammonium bromide, a tetrapropylammonium hydroxide, a tetrapropylammonium chloride, a tetrapropylammonium iodide and a tetrapropylammonium fluoride).

Acoustic performance measurement, the sound absorbing material is filled into the speaker box, and the volume of the acoustic cavity is 1 cubic centimeter (referred to as 1 cc). The specific test data is shown in table 1.

After adding 1 cc of the sound absorbing material, the resonance frequency F0 is significantly lower than that without the sound absorbing material, and the more the low-frequency is lowered, indicating that the sound absorbing material has better low-frequency improvement effect.

The reduction value after high temperature and high humidity stability evaluation not only represents the low frequency improvement effect of the sound absorbing material under severe use environment, but also reflects the performance stability of the sound absorbing material in long-term use. The larger the value, the more stable the sound absorbing material.

The water absorption rate reflects the patency of the micro-porous channels in the normal use environment of the sound absorbing material. The higher the water absorption rate, the more micro-pores occupied by water, the worse the micro-pores patency in the normal use environment, and XRD pattern of the structure of the sound absorbing material of the first embodiment pattern of the zeolite is shown in FIG. 1.

Embodiment 2

Figure 2:
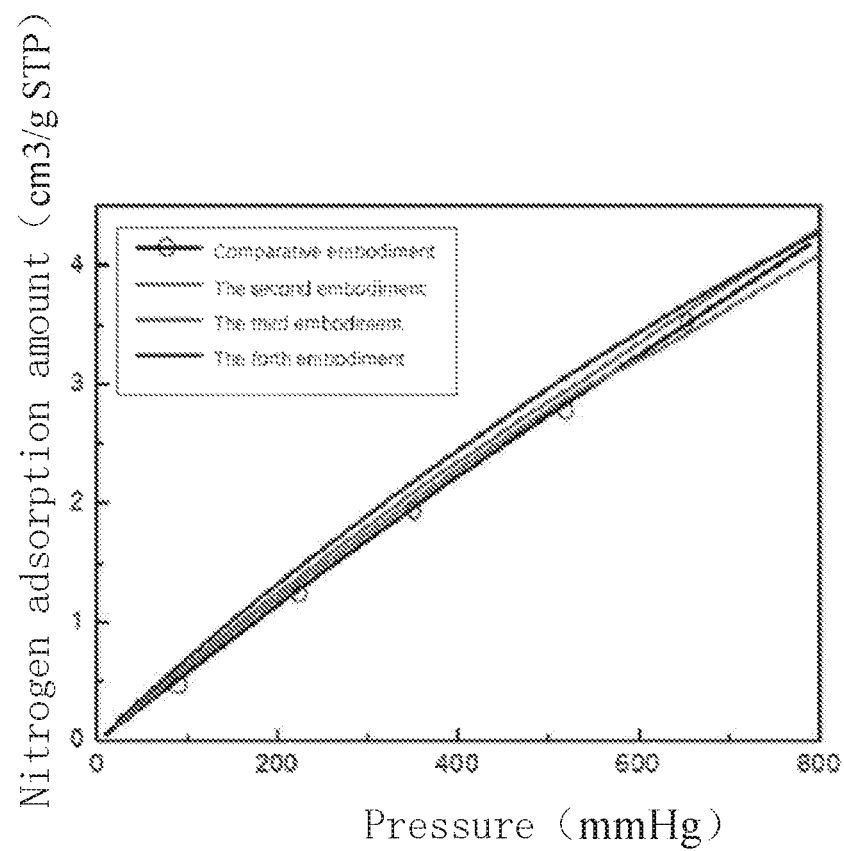
FIG. 2 is a curve graph of an adsorption amount of nitrogen gas with the pressure at a normal temperature (25° C.) in some embodiment of the sound absorbing material of the present disclosure and comparative example 1.

In second embodiment of the sound absorbing material of the present disclosure, the second embodiment is substantially the same as the first embodiment, except that on the basis of the first embodiment, the mass ratio of the Si to Al is changed to 120. The acoustic performance data is shown in Table 1, and the normal temperature nitrogen adsorption amount is shown in FIG. 2.

Embodiment 3

In the third embodiment of the sound absorbing material of the present disclosure, the third embodiment is substantially the same as the first embodiment, except that on the basis of the first embodiment, the mass ratio of Si to Al is adjust to 180. The acoustic performance data is shown in Table 1, and the normal temperature nitrogen adsorption amount is shown in FIG. 2.

Embodiment 4

In the fourth embodiment of the sound absorbing material of the present disclosure, the fourth embodiment is substantially the same as the third embodiment, except that on the basis of the third embodiment, the third embodiment is exchanged with silver nitrate to obtain a silver MFI-structural-type zeolite. The acoustic performance data is shown in Table 1, and the normal temperature nitrogen adsorption amount is shown in FIG. 2.

Embodiment 5

Figure 3:
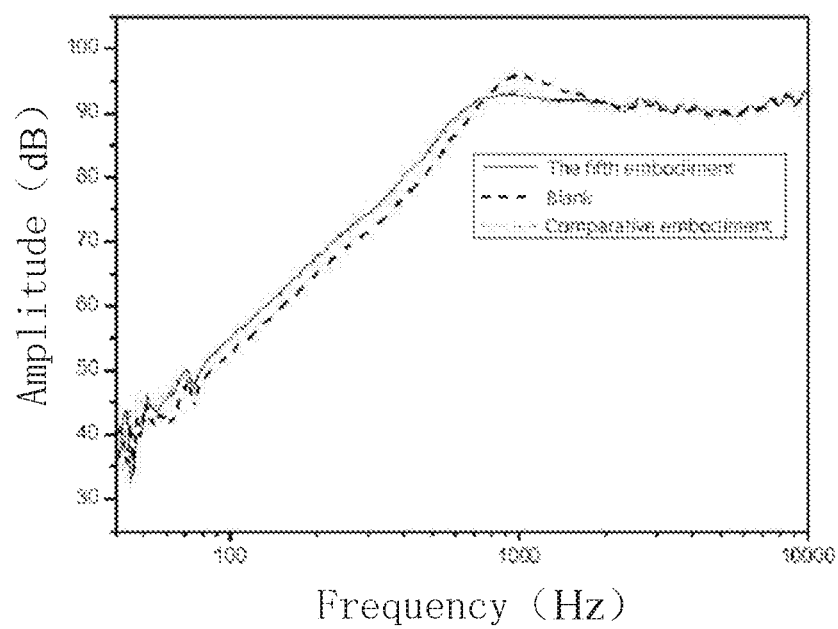
FIG. 3 is a comparison diagram of the sound pressure frequency response curve between Example 5 and Example 1 of the sound-absorbing material of the present application.

In the fifth embodiment of the sound absorbing material of the present disclosure, the fifth embodiment is substantially the same as the third embodiment, except that on the basis of the third embodiment, the third embodiment is exchanged with a sodium salt to obtain a sodium MFI-structural-type zeolite. The sodium salt comprises at least one of sodium chloride, sodium sulfate, sodium nitrate and the like, but is not limited thereto. The acoustic performance data is shown in Table 1. The sound pressure frequency response curve is measured by inserting the sound absorbing material into the speaker box after molding, as shown in FIG. 3.

Embodiment 6

In the sixth embodiment of the sound absorbing material of the present disclosure, the sixth embodiment is substantially the same as the third embodiment, except that on the basis of the third embodiment, the third embodiment is exchanged with a potassium salt to obtain a potassium MFI-structural-type zeolite. The potassium salt comprises at least one of potassium chloride, potassium sulfate, potassium nitrate, and the like, but is not limited thereto. The acoustic performance data is shown in table 1.

Embodiment 7

In the seventh embodiment of the sound absorbing material of the present disclosure, the seventh embodiment is substantially the same as the third embodiment, except that on the basis of the third embodiment, a potassium salt of a lithium potassium MFI structure is exchanged with a potassium salt having a concentration ratio of 2:3 and a lithium salt. The potassium salt comprises at least one of potassium chloride, potassium sulfate, potassium nitrate, and the like, but is not limited thereto; the lithium salt comprises at least one of lithium chloride, lithium sulfate, lithium carbonate, and the like, but not only Limited to this. The acoustic performance data is shown in table 1.

Embodiment 8

In the eighth embodiment of the sound absorbing material of the present disclosure, the eighth embodiment is substantially the same as the second embodiment, except that on the basis of the second embodiment, the lithium salt is exchanged for the lithium MFI-structural-type zeolite. The lithium salt comprises at least one of lithium chloride, lithium sulfate, lithium carbonate, and the like, but is not limited thereto. The acoustic performance data is shown in table 1.

Embodiment 9

In the ninth embodiment of the sound absorbing material of the present disclosure, the ninth embodiment is substantially the same as the second embodiment, except that, on the basis of the second embodiment, a potassium salt, a sodium salt and a lithium salt having a concentration ratio of 1:1:1 are mixed and exchanged for lithium sodium potassium MFI-structural-type zeolite. Its acoustic performance is shown in Table 1.

Embodiment 10

In the tenth embodiment of the sound absorbing material of the present disclosure, the tenth embodiment is substantially the same as the second embodiment, except that on the basis of the second embodiment, the potassium MFI-structural-type zeolite is obtained by exchanging three times with a potassium salt. Its acoustic performance is shown in Table 1.

Embodiment 11

In the eleventh embodiment of the sound absorbing material of the present disclosure, the eleventh embodiment is substantially the same as the third embodiment, except that on the basis of the third embodiment, the potassium salt is exchanged once, and then the cesium salt is exchanged once to obtain a potassium cerium MFI-structural-type zeolite. Its acoustic performance is shown in table 1.

Embodiment 12

In the twelfth embodiment of the sound absorbing material of the present disclosure, the twelfth embodiment is substantially the same as the third embodiment, except that on the basis of the third embodiment, the mass ratio of Si to Al is adjust to 195 synthesis, using a potassium salt and a lithium salt having a concentration ratio of 1:1. The mixed exchange is a lithium potassium MFI-structural-type zeolite. Its acoustic performance is shown in table 1.

In the first comparative example of the related art, the first comparative example of the related art is substantially the same as the first example of the present disclosure, except that on the basis of the first example of the present disclosure, the mass ratio of Si to Al is changed to 350. When comparing the sound absorbing materials of the first comparative example of the related art, the normal temperature nitrogen adsorption amount is shown in FIG. 2, and the sound pressure frequency response curve is shown in FIG. 3.

In the second comparative example of the related art, the second comparative example of the related art is substantially the same as the first example of the present disclosure, except that the mass ratio of Si to Al is changed to 60 on the basis of the first example of the present disclosure. Its acoustic performance is shown in table 1.

In the third comparative example of the related art, the third comparative example of the related art is substantially the same as the first example of the present disclosure, except that the mass ratio of Si to Al mass ratio is adjust to 30 on the basis of the first example of the present disclosure. Its acoustic performance is shown in table 1.

TABLE 1

Acoustic performance parameters before and after adding MFI zeolite to the posterior cavity of speaker box.

| | 1CC sound absorbing material | | | | | | |
|---|---|---|---|---|---|---|---|
| | Cavity | | After adding 1CC sound absorbing material | | Reduction value | | Reduction Value after Evaluation of High Temperature and Humidity Stability | | Rate of Water absorption/% (25° C. •80% |
| Sample | $F_0$(Hz) | Q | $F_0$(Hz) | Q | $\Delta F_0$(Hz) | $\Delta Q$ | $\Delta F_0$(Hz) | $\Delta Q$ | Humidity) |
| Embodiment 1 | 921 | 1.5 | 750 | 0.6 | 171 | 0.9 | 50 | 0.2 | 5.6 |
| Embodiment 2 | 920 | 1.5 | 680 | 0.7 | 240 | 0.8 | 140 | 0.7 | 4.2 |
| Embodiment 3 | 919 | 1.5 | 665 | 0.7 | 254 | 0.8 | 196 | 0.7 | 2.8 |
| Embodiment 4 | 920 | 1.5 | 655 | 0.7 | 265 | 0.8 | 231 | 0.8 | 2.1 |
| Embodiment 5 | 920 | 1.5 | 653 | 0.7 | 267 | 0.8 | 235 | 0.8 | 1.9 |
| Embodiment 6 | 918 | 1.5 | 652 | 0.7 | 266 | 0.8 | 238 | 0.8 | 1.9 |
| Embodiment 7 | 918 | 1.5 | 653 | 0.7 | 265 | 0.8 | 236 | 0.8 | 1.9 |
| Embodiment 8 | 919 | 1.5 | 650 | 0.7 | 269 | 0.8 | 240 | 0.8 | 1.9 |
| Embodiment 9 | 918 | 1.5 | 662 | 0.7 | 256 | 0.8 | 239 | 0.8 | 1.9 |
| Embodiment 10 | 919 | 1.5 | 669 | 0.7 | 250 | 0.8 | 239 | 0.8 | 2.2 |
| Embodiment 11 | 919 | 1.5 | 656 | 0.7 | 263 | 0.8 | 238 | 0.8 | 2.0 |
| Embodiment 12 | 918 | 1.5 | 658 | 0.7 | 260 | 0.8 | 236 | 0.8 | 1.9 |
| First comparative example | 919 | 1.5 | 667 | 0.7 | 252 | 0.8 | 193 | 0.7 | 1.8 |
| Second comparative example | 919 | 1.5 | 880 | 1.3 | 39 | 0.2 | 31 | 0.1 | 7.8 |
| Third comparative example | 918 | 1.5 | 907 | 1.5 | 11 | 0 | 12 | 0.1 | 9.8 |

According to Table 1, it can be concluded that the resonance frequency F0 of the speaker box is greatly reduced after the original sound absorbing material of the first embodiment to the twelfth embodiment is filled in the posterior cavity of the speaker. In addition, the resonance frequency F0 in the long-term stability test of the product is also greatly reduced, that is, good stability.

Figure 4:
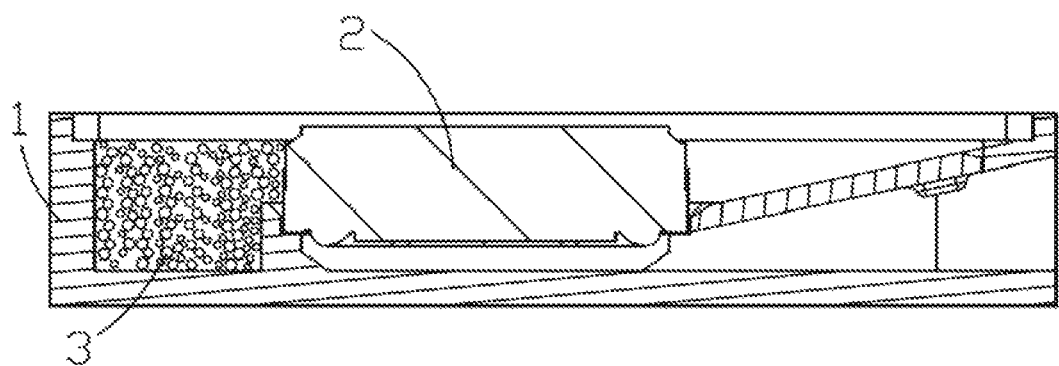
FIG. 4 is a schematic diagram of the structure of the speaker box of the present disclosure.

The present disclosure also provides a speaker box 100 as shown in FIG. 4. The speaker box 100 comprises a shell 1 having receiving space, a speaker 2 accommodating in the shell 1, and a posterior cavity 3 which is defined by the speaker 2 and the shell 1. The above-mentioned sound absorbing material is filled in the posterior cavity 3 so as to enhance the acoustical compliance of the air in the posterior cavity 3 and to improve the low-frequency performance of the speaker box 100.

Compared with the relevant art, for the sound absorbing material of the present disclosure, since the MFI-structural-type zeolite is ultimately composed of silicon dioxide having a plurality of uniform micro-pores, and the micro-pores under the action of acoustic pressure to absorb and desorb the attached air molecules. The micro-porous structure of the MFI-structural-type zeolite can play a role in increasing the volume of the virtual acoustic cavity, while filling sound absorbing material of the MFI-structural-type zeolite having a plurality of uniform microporous in the posterior cavity, it can significantly improve the low-frequency effect of the speaker system and improve the low-frequency performance. Since the MFI-structural-type zeolite can be placed in a small cavity due to its small volume, it can solve the problem that the sound chamber of the speaker box is difficult to package the sound absorbing material, and the requirement that the speaker box develop toward a smaller and smaller volume is satisfied.

By balancing the contradiction between water absorption and electrostatic field action, selecting suitable synthesis and post-treatment methods, the MFI-structural-type zeolite which is not easy to absorb water and obviously increases the amount of air adsorbed and desorbed at room temperature is obtained, and the zeolite has better performance in low frequency improvement. Preferably, the framework of the MFI-structural-type zeolite comprises $SiO_2$ and $Al_2O_3$, and the mass ratio of Si to Al in the framework is less than 200 and not less than 50, and has an excellent low-frequency effect. In addition, since the MFI-structural-type zeolite contains more frameworks, the stability of the MFI-structural-type zeolite is improved to a certain extent.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A speaker box, comprising:
a shell having a receiving space;
a speaker accommodating in the shell; and
a rear cavity which is defined by the speaker and the shell, wherein a sound absorbing material is filled in the rear cavity;
the sound absorbing material comprising: MFI-structural-type zeolite which comprises a framework, the framework comprises $SiO_2$ and $Al_2O_3$, and a mass ratio of Si to Al in the framework of the MFI-structural-type zeolite is less than 140 and not less than 50;
wherein the MFI-structural-type zeolite further comprises extra-framework cations.

2. The speaker box as described in claim 1, wherein the framework further comprises metal oxide containing trivalent and/or tetravalent metal ion in addition to $Al_2O_3$.

3. The speaker box as described in claim 1, wherein the framework further comprises at least one Oxide of B, Fe, Ga, Cr, Ti, Zr, and Ge.

4. The speaker box as described in claim 1, wherein a particle size of MFI-structural-type zeolite is between 10 nm and 10 μm.

5. The speaker box as described in claim 4, wherein the particle size of MFI-structural-type zeolite is between 20 nm and 8 μm.

6. The speaker box as described in claim 5, wherein the particle size of MFI-structural-type zeolite is between 40 nm and 6 μm.

7. The speaker box as described in claim 1, wherein the extra-framework cations comprise at least one of a hydrogen ion, a monovalent copper ion, a monovalent silver ion, a monovalent gold ion, an alkali metal, and an alkaline earth metal.

8. The speaker box as described in claim 1, wherein the MFI-structural-type zeolite is formed into shaped particles by adding a binder, the shaped particles have a particle size of 10 μm to 1000 μm.

9. The speaker box as described in claim 8, wherein the shaped particles have a particle size between 20 μm and 600 μm.

10. The speaker box as described in claim 9, wherein the shaped particles have a particle size of 30 μm to 450 μm.

11. The speaker box as described in claim 8, wherein the binder comprises an inorganic binder or an organic polymer binder.

* * * * *